E. H. ROLLIN.
FLUID GAGE FOR AUTOMOBILES.
APPLICATION FILED DEC. 15, 1919.
1,376,164.
Patented Apr. 26, 1921.
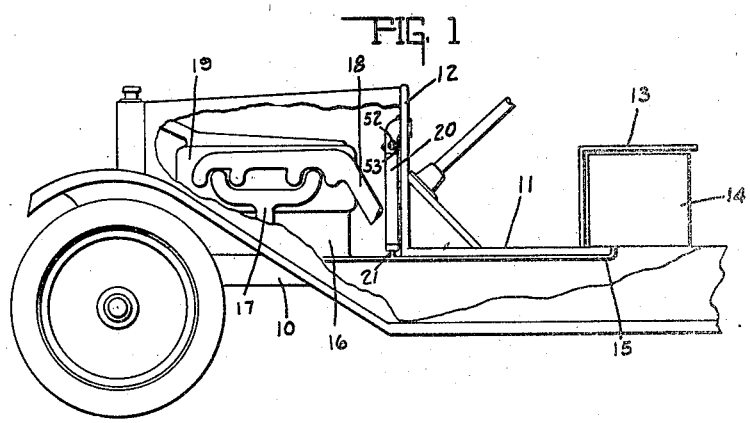
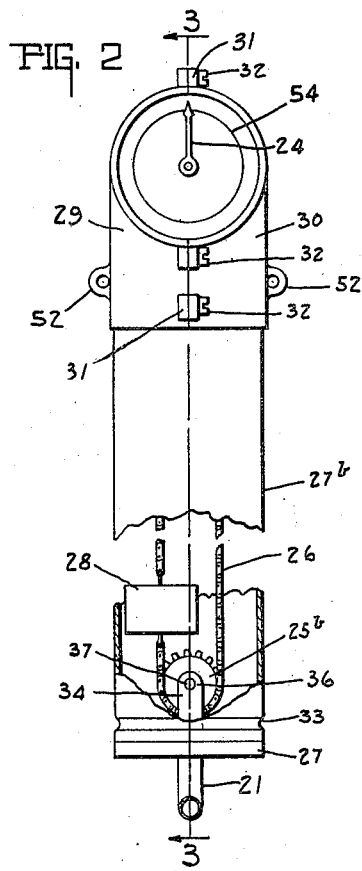
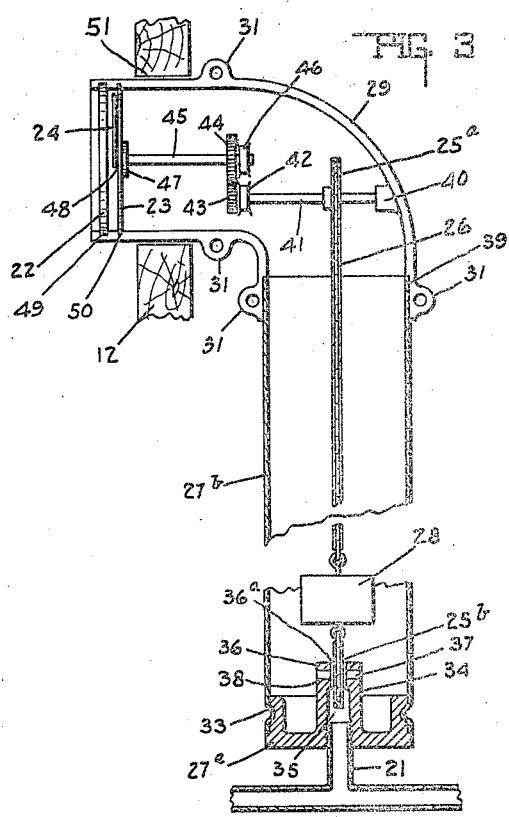
INVENTOR.
EUGENE H. ROLLIN.
BY
ATTORNEYS.

UNITED STATES PATENT OFFICE.

EUGENE H. ROLLIN, OF INDIANAPOLIS, INDIANA.

FLUID-GAGE FOR AUTOMOBILES.

1,376,164.  Specification of Letters Patent.  Patented Apr. 26, 1921.

Application filed December 15, 1919. Serial No. 344,799.

*To all whom it may concern:*

Be it known that I, EUGENE H. ROLLIN, a citizen of the United States, and a resident of Indianapolis, county of Marion, and State of Indiana, have invented a certain new and useful Fluid-Gage for Automobiles; and I do hereby declare that the following is a full, clear, and exact description thereof, reference being had to the accompanying drawings, in which like numerals refer to like parts.

The chief object of this invention is to improve the float gage shown in Patent No. 1,162,352, patented November 30, 1915, by providing the same with an improved and novel supporting casing or tube.

One feature of the invention is in constructing the novel tube in sections, one portion thereof supporting the indicating gage mechanism and the other permitting access to the same for assembling purposes.

A further feature of the invention is in connecting the gage directly to the supply line connecting the fuel tank to the carbureter.

The full nature of this invention will be understood from the accompanying drawings and the following description and claims.

In the drawings Figure 1 is an elevational view of a portion of an automobile chassis, parts of said chassis being broken away to show the invention and the method of mounting the same thereon. Fig. 2 is an elevational view of the invention with parts broken away to show other parts in detail. Fig. 3 is a central sectional view of the invention taken on the line 3—3 of Fig. 2.

In the drawings there is shown an automobile chassis comprising the usual frame 10, floor board 11, instrument board 12, seat 13, fuel tank 14 and steering column. The engine 16 is provided with an intake manifold 17, exhaust manifold 18 and water jacket 19, said intake manifold 17 communicating with a carbureter, not shown, the same being supplied with fuel from the tank 14 by the supply line 15. The novel gage 20 is herein shown mounted substantially similar to a gage shown in the prior patent referred to, the instrument dial being visible on the instrument board 12, the lower portion of said tube in this instance, however, being suitably connected to the supply line. Herein the supply line is shown provided with a T-connection 21 which communicates with the gage tube 20 for the purpose described.

The gage is shown provided with a transparent protecting cover plate 22, a dial plate 23, an indicator or finger 24, an upper sprocket wheel $25^a$, sprocket chain 26, a float 28 and lower sprocket wheel $25^b$, all of the foregoing being substantially the same as that shown in the prior patent referred to.

The novel and improved gage tube is herein shown composed of but four parts, namely, a novel base portion $27^a$, a tubular portion $27^b$, a section 29 of an elbow and the other section of said elbow 30. Said sections are provided with adjacent ears 31 projecting therefrom, by which the sections are secured together by suitable means, such as by the threaded bolts 32. The base block $27^a$ is herein shown provided with an annular groove 33 and an inwardly and centrally projecting portion 34, the same having a threaded opening 35 therein in which the T connection is secured. Extending upwardly from the projection 34 are a pair of parallel standards 36 which form a slot $36^a$ therebetween. The standards are provided with registering and transversely extending shaft bearing openings 37, the same rigidly supporting a sprocket shaft 38 upon which the lower sprocket wheel $25^b$ is secured. From the foregoing it will be understood that the width of the slot $36^a$ is greater than the width of the endless sprocket chain 26. It will also be understood that the T connection discharges through the slot $36^a$ and also sidewardly therefrom, as shown by the broken portion of Fig. 2. The tube $27^b$ incloses the lower sprocket wheel, sprocket chain and float 28, the same being introduced between the two ends of the chain 26. The lower end of said tube is suitably secured to the base $27^a$ by having the end spun into the annular groove 33, or otherwise secured thereto to form a leak proof joint.

The upper end of said tube is seated in a slotted portion 39 formed in the elbow sections, said tube being securely seated therein when the sections are secured together by means of the bolts 32.

The section 29 is provided with a bracket bearing 40, the same being adapted to receive one end of the sprocket shaft 41 carrying the upper sprocket wheel $25^a$. The other end of said shaft extends through the bearing 42 also formed upon and within the elbow section 29. Said shaft extends through said bearing and carries on its forward end a gear 43, the same meshing with a gear 44 carried by the indicating shaft 45. The indicating shaft 45 is suitably mounted in the bearing 46 also secured within and formed upon the section 29, and the bushing 47 herein shown secured to the dial plate 23. Upon the forward end of the indicating shaft 45 is secured the indicator 24, said shaft extending through an opening 48 in the dial 23. The section 29 is shown provided with a pair of slots 49 and 50 upon the interior of the same, in which the plate 22 and the dial 23 are respectively seated. The section 30 also has similar slots formed therein to engage and seat said plate and dial. The forward end of said assembled elbow projects forwardly through an opening 51 in the dash 12, so that said dial and indicating finger are visible from the seat. The elbow is further provided with suitable ears 52 by which the gage is secured to the instrument board by suitable means, such as the bolts 53.

The operation of the gage is substantially similar to that shown in the prior patent referred to, the float being movable longitudinally of the vertical tube 27$^b$, said float following the level of the fluid. As the level rises and falls in said tank 14, said float actuates the sprocket chain, whereby the sprocket shaft 41 is caused to rotate the indicating shaft 45 through the medium of the reducing gears 43 and 44, as shown. As the shaft 45 rotates, the indicating finger is revolved around the face of the dial to indicate the amount of fuel in said tank by coöperating with a suitable scale 54 upon the face of the dial 23.

With this construction it is possible to rotatably mount the sprocket wheel 25$^b$ in the base 27$^a$, and secure the latter to the tube 27$^b$. Similarly the sprocket wheel 25$^a$ is secured upon the sprocket shaft 41, the same then rotatably mounted in the bearings, as shown. Similarly the shaft 45 is mounted in the bearing 46 and bushing 47 and the finger positioned thereon. The section 29 is then inserted in the opening 51 of the instrument board, and simultaneously engages the upper edge of the tube 27$^b$ and seats the same in the slot 39. The ends of the sprocket chain are then brought to the exposed portion of the elbow and the float inserted and secured between the ends of said chain. The latter is then positioned upon the upper sprocket wheel, the indicating finger being adjusted to the proper position with respect to the indicating shaft 45 and the scale on the dial 23 so that said finger when actuated by said float will indicate the true amount of fuel in the tank. The section 30 of the elbow is then inserted through the opening 51 and positioned adjacent the section 29 and secured thereto by the bolts 32, as described. The gage is then rigidly secured to the instrument board by means of the bracket ears 52 and bolts 53.

From the foregoing it will be understood that there is provided a novel and improved gage casing by which the same may be secured to the chassis of an automobile and the like, and which also provides for ease in assembling the gage itself therein, and which is of but few parts and simple construction.

The invention claimed is:

1. In a fluid gage the combination with a float, a pair of superposed sprocket wheels, a sprocket chain associated with said float and actuated thereby to rotate said sprocket wheels, an indicating dial and a finger associated with said dial and operable by the upper sprocket wheel, of a tubular casing in which said float is mounted, means closing the upper end of said tubular casing and adapted to receive the indicating means and upper sprocket wheel, a base to which said tube is secured for closing the same to form a float chamber, said base being provided with an inlet to admit fluid to said tube to actuate said float, and standard means secured to said base and projecting upwardly therefrom to rotatably support the lower sprocket wheel.

2. In a fluid gage the combination with a fluid containing casing, a sprocket wheel rotatably supported in the base thereof, a float movable in said casing and actuated by the fluid and a sprocket chain associated with said sprocket wheel and actuated by said float, of a second sprocket wheel rotatable by said chain, a sectionalized elbow adapted to project through the instrument board of an automobile and be visible therethrough, said elbow having within its open end an annular groove, the other end of said elbow being rigidly secured to the upper end of said tubular casing, a dial positioned in the open end of said sectionalized elbow and seated in said groove, a shaft extending through said dial, an indicating finger carried on said extended end of the shaft and coöperating with said dial to indicate the fluid level in said tubular casing, a sprocket shaft rigid with said second mentioned sprocket wheel and rotatable thereby, meshing gears carried by said shafts for actuating said indicating finger, said second mentioned sprocket wheel, sprocket shaft meshing gears and indicating shaft being supported in assembled relation to one of said sections of said sectionalized elbow, the other section of said elbow when positioned upon said first mentioned section rigidly securing said dial in position within said annular groove, and means for securing said sections of said elbow together and secure the same to said tubular casing.

3. In a fluid gage the combination with a fluid containing casing, a sprocket wheel rotatably supported in the base thereof, a float movable in said casing and actuated by the fluid and a sprocket chain associated with said sprocket wheel and actuated by said float, of a second sprocket wheel rotatable by said chain, a sectionalized elbow adapted to project through the instrument board of an automobile and be visible therethrough, the end of said elbow being rigidly secured to the upper end of said tubular casing, a dial positioned in the open end of said sectionalized elbow, a shaft extending through said dial, an indicating finger carried on said extended end of the shaft and coöperating with said dial to indicate the fluid level in said tubular casing, a sprocket shaft rigid with said second mentioned sprocket wheel and rotatable thereby, meshing gears carried by said shafts for actuating said indicating finger, said second mentioned sprocket wheel, sprocket shaft, meshing gears and indicating shaft being supported in assembled relation to one of said sections of said sectionalized elbow, the other section of said elbow being positioned on said first mentioned section so as to inclose and house the gears and shafts, and means for securing said sections of said elbow together and secure the same to said tubular casing.

4. A liquid fuel gage for automobiles including a fluid containing tube adapted to be mounted on the automobile in the same relative position as the liquid fuel tank, a bottom closer for said tube, a sectional head adapted to be secured to the top of said tube, an indicating dial and finger mounted in one section of said head, float operated means mounted in one section of said head for actuating said finger according to the positioning of said float by the rise and fall of liquid fuel in said tube, means for securing said section heads together on said tube after the operative parts therein have been assembled, and a conduit connecting said tube directly with the liquid fuel feed line between the tank and carbureter of the automobile.

In witness whereof I have hereunto affixed my signature.

EUGENE H. ROLLIN.